(12) United States Patent
Dennis

(10) Patent No.: US 9,341,364 B2
(45) Date of Patent: May 17, 2016

(54) TOILET INSTALLATION TOOL

(71) Applicant: Michael Anthony Dennis, Grand Island, NY (US)

(72) Inventor: Michael Anthony Dennis, Grand Island, NY (US)

( * ) Notice: Subject to any disclaimer, the term of this patent is extended or adjusted under 35 U.S.C. 154(b) by 264 days.

(21) Appl. No.: 14/273,655

(22) Filed: May 9, 2014

(65) Prior Publication Data

US 2014/0331470 A1     Nov. 13, 2014

Related U.S. Application Data

(60) Provisional application No. 61/822,351, filed on May 11, 2013.

(51) Int. Cl.
*F16B 19/02*     (2006.01)
*F21V 33/00*     (2006.01)
*E03D 11/16*     (2006.01)

(52) U.S. Cl.
CPC ............ *F21V 33/0084* (2013.01); *E03D 11/16* (2013.01); *F16B 19/02* (2013.01); *Y10T 29/49826* (2015.01)

(58) Field of Classification Search
CPC ..... F21V 33/0084; E03D 11/16; F16B 19/02; Y10T 29/49826
See application file for complete search history.

(56) References Cited

U.S. PATENT DOCUMENTS

| | | | | |
|---|---|---|---|---|
| 4,233,697 | A * | 11/1980 | Cornwall | E03D 11/16 138/89 |
| 6,254,141 | B1 * | 7/2001 | Piper | E03D 11/16 285/56 |
| 6,443,495 | B1 * | 9/2002 | Harmeling | E03B 11/16 285/3 |
| 7,303,299 | B2 * | 12/2007 | Theus | F21V 33/004 222/113 |
| 8,210,785 | B1 * | 7/2012 | Gager | E03D 11/16 411/338 |
| 9,051,723 | B2 * | 6/2015 | Junca | E03D 11/16 |
| 9,091,048 | B2 * | 7/2015 | Arthurs | E03D 11/135 |
| 9,140,416 | B2 * | 9/2015 | Bostic | F21L 4/00 |
| 2011/0221218 | A1 * | 9/2011 | Hazel | E03D 11/135 294/145 |
| 2013/0227772 | A1 * | 9/2013 | Schuster | E03D 11/17 4/300 |
| 2015/0322662 | A1 * | 11/2015 | Schuster | E03D 11/16 29/890.141 |

* cited by examiner

*Primary Examiner* — Richard Chang
(74) *Attorney, Agent, or Firm* — Hodgson Russ LLP

(57) ABSTRACT

A toilet installation tool for assisting an installer in aligning a toilet mounting hole in a base of a toilet with a closet bolt projecting upward from a bathroom floor includes a sleeve configured to removably mount on the closet bolt in alignment with a vertical axis of the closet bolt, and a light source attached to a top end of the sleeve. The sleeve and the light source are sized to pass through the toilet mounting hole and are removable from the closet bolt after a toilet has been lowered onto the bathroom floor. The invention may be embodied as a kit having two light sources and two or more interchangeable sleeves of different lengths. A method of mounting a toilet on a pair of closet bolts using the toilet installation tool is also disclosed.

13 Claims, 4 Drawing Sheets

TOILET INSTALLATION TOOL

CROSS-REFERENCE TO RELATED APPLICATIONS

The present application claims benefit of U.S. Provisional Application No. 61/822,351 filed May 11, 2013, the entire disclosure of which is incorporated herein by reference.

FIELD OF THE INVENTION

The present invention relates generally to plumbing tools, and more particularly to tools for assisting in the installation of a toilet.

BACKGROUND OF THE INVENTION

FIGS. 1 and 2 illustrate a common arrangement for installing a toilet 10. A closet flange 12 is seated in a hole in bathroom floor 14 to provide a passageway from the toilet's outlet drain to a soil pipe. Closet flange 12 is circumferentially sealed by a wax ring 16. A pair of closet bolts 20 are received through diametrically opposed slots 13 in closet flange 12 and extend vertically upward from bathroom floor 14. Toilet 10 includes a base 18 having a pair of mounting holes 19 corresponding to the pair of closet bolts 20.

During installation of toilet 10, the toilet is manually lifted and positioned over wax ring 16 such that the pair of mounting holes 19 in the base of the toilet are respectively aligned with the pair of closet bolts 20 along the vertical axes of the closet bolts. Once alignment is achieved, toilet 10 is lowered such that closet bolts 20 extend through mounting holes 19 and the base 18 of toilet 10 rests on bathroom floor 14. Securing nuts (not shown) may be tightened onto closet bolts 20 to fix the toilet in place, and cosmetic covers (not shown) may be installed over mounting holes 19 to hide the bolted connection.

Significant strength and skill are required to properly install the toilet. A recognized difficulty is that it is hard to see the closet bolts during the alignment step because the toilet itself blocks overhead light. Since the toilet is heavy, it is difficult to lower the toilet onto closet bolts 20 while maintaining alignment. Often, only one of the two mounting holes 19 is aligned with its corresponding closet bolt 20 as the aligned mounting hole begins to receive the top of the closet bolt, and the toilet must be lifted up and adjusted in an attempt to align the other mounting hole with the other closet bolt. Since the closet bolts 20 move at the slightest touch, this situation is the source of much frustration, especially for do-it-yourselfers who lack toilet installation experience. It is important to have complete alignment of mounting holes 19 with closet bolts 20 before toilet 10 is lowered onto the closet bolts.

Another problem that occurs during toilet installation is that wax ring 16 may be inadvertently knocked out of alignment with the center of the drain hole or damaged by contact with the toilet. This problem occurs more frequently when a taller double wax ring is used because standard closet bolts are too short in relation to the wax ring. This problem is usually discovered after installation because the leakage occurs.

If taller non-standard closet bolts are used, and/or if the wax ring is crushed down during installation, the top end of each closet bolt may extend up too far through the corresponding mounting hole such that a cosmetic cover ("beauty cap") cannot be placed over the mounting hole to hide the bolted connection. Cutting the closet bolts down to a shorter size after installation is challenging and commonly results in damage to the toilet's finish and/or bent closet bolts. Therefore, it is desirable to pre-cut the closet bolts down to a final desired height prior to installation of the toilet. However, as described above, short closet bolts make installation more difficult.

What is needed is a toilet installation tool that solves the problems mentioned above so that professional plumbers and do-it-yourselfers can install a toilet correctly on the first try.

SUMMARY OF THE INVENTION

The present invention provides a toilet installation tool for assisting an installer in aligning a toilet mounting hole in a base of a toilet with a closet bolt projecting upward from a bathroom floor. The tool generally comprises a sleeve configured to removably mount on the closet bolt in alignment with a vertical axis of the closet bolt, and a light source attached to a top end of the sleeve. The sleeve and the light source are sized to pass through the toilet mounting hole and are removable from the closet bolt after a toilet has been lowered onto the bathroom floor.

The invention may be embodied in a kit having two light sources and two or more sleeves, whereby a pair of tools may be assembled, one for each of the pair of closet bolts. In an advantageous embodiment, the sleeves in the kit may have various lengths so that the light source of one tool is at a different height than the light source of the other tool when the pair of tools are mounted on the respective closet bolts, thereby eliminating the need for simultaneous alignment of the toilet mounting holes with the closet bolts.

The invention may also be embodied in a method of mounting a toilet on a pair of closet bolts each projecting upward from a bathroom floor during installation of the toilet. The method generally comprises (i) removably mounting first and second light sources on a pair of closet bolts, respectively, wherein the light sources are aligned on a vertical axis of the corresponding closet bolt, (ii) turning on the light sources, lifting the toilet above the light sources and respectively aligning a pair of toilet mounting holes in a base of the toilet with the light sources, (iii) lowering the toilet onto the floor such that each light source passes through one of the pair of toilet mounting holes, and (iv) removing the first and second light sources from the first and second closet bolts.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

Figure 1:
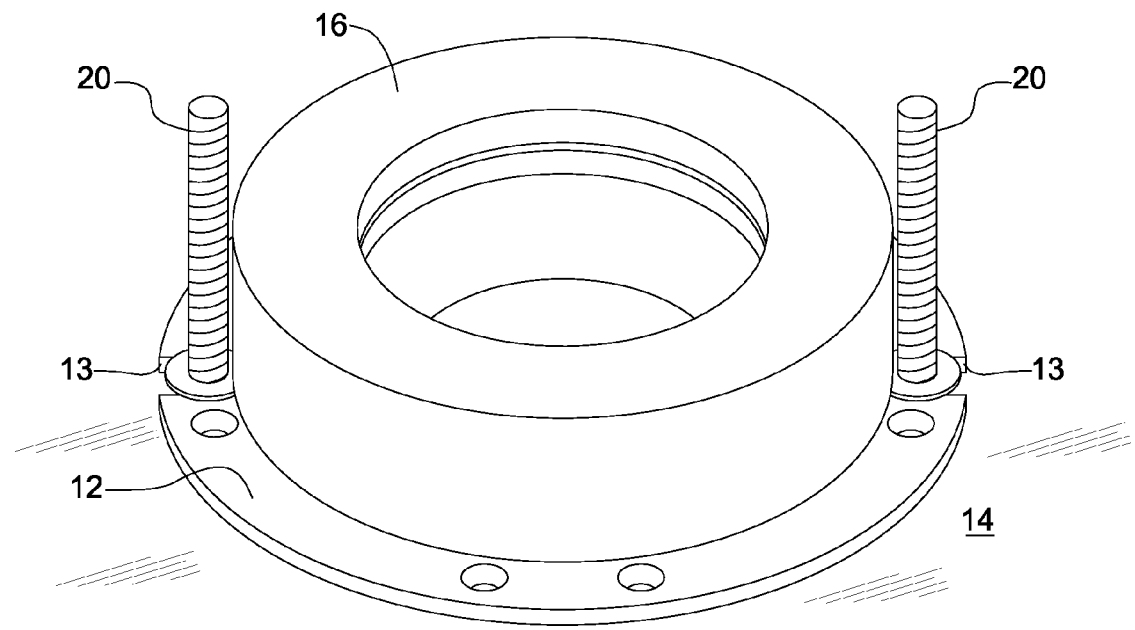
FIG. 1 is a perspective view illustrating a drain pipe assembly according to a known arrangement, wherein the assembly includes a closet flange, wax ring, and a pair of vertical closet bolts for mounting a toilet.
Figure 2:
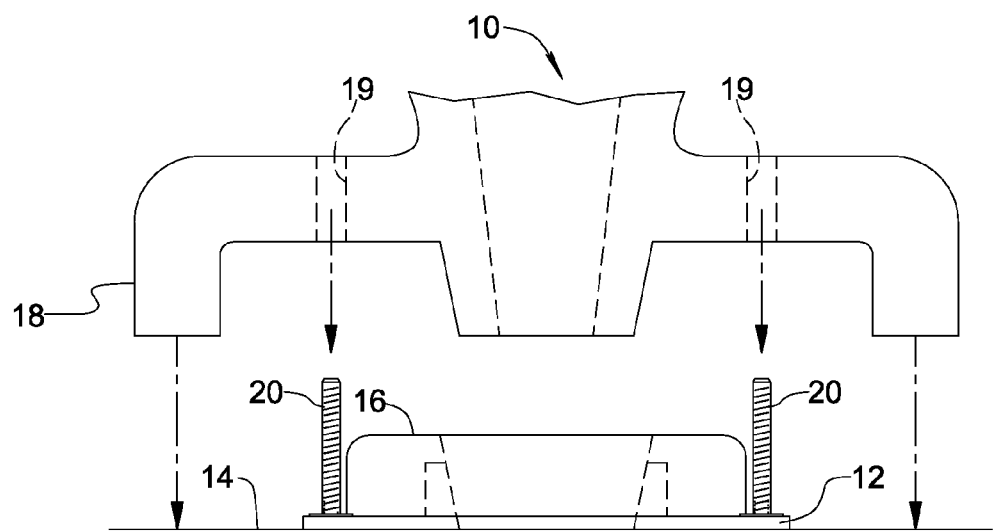
FIG. 2 is an elevational view illustrating a toilet and drain pipe assembly according to a known arrangement, wherein the toilet is shown during installation onto a pair of vertical closet bolts.
Figure 3:
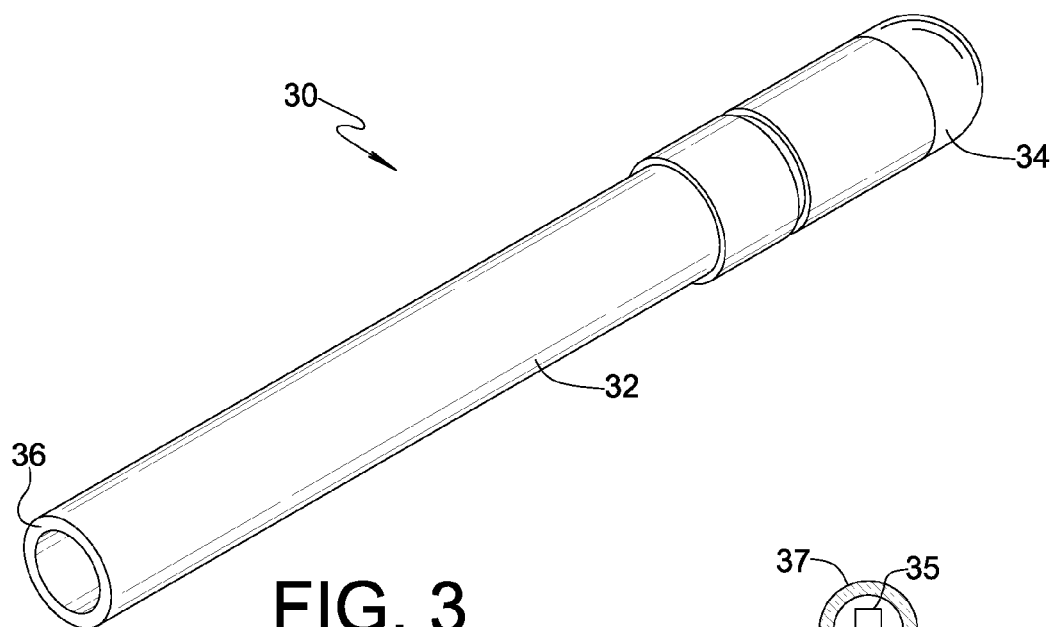
FIG. 3 is a perspective view of a toilet installation tool formed in accordance with an embodiment of the present invention.
Figure 4:
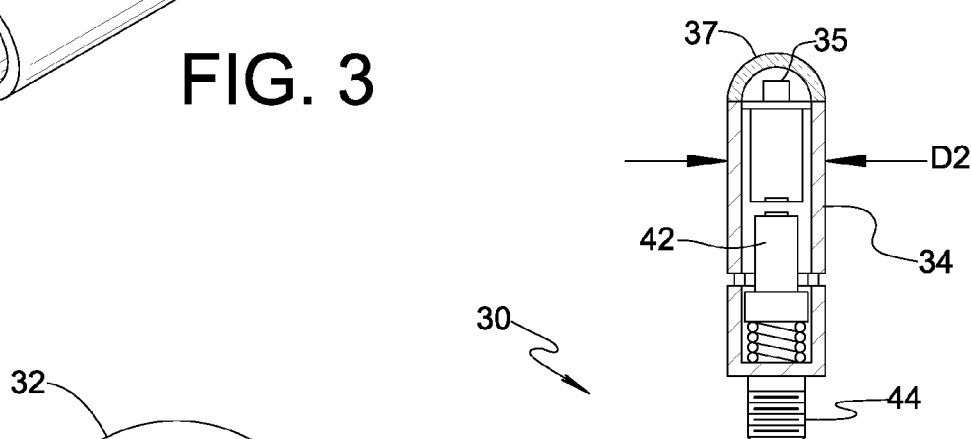
FIG. 4 is an exploded, longitudinally sectioned view of the toilet installation tool shown in FIG. 3.
Figure 4:
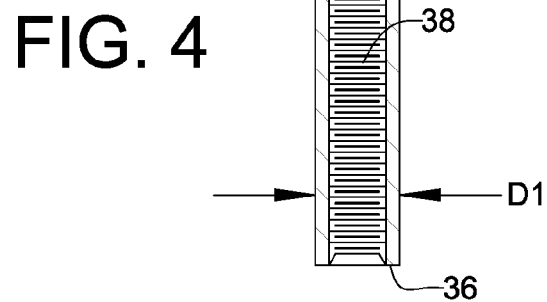

FIGS. 3 and 4 show a toilet installation tool 30 formed in accordance with an embodiment of the present invention. Tool 30 generally comprises a sleeve 32 and a light source 34 attached to a top end of the sleeve. Sleeve 32 has an open bottom end 36 and is configured to removably mount on a closet bolt 20 in alignment with a vertical axis of the closet bolt. An outer diameter D1 of sleeve 32 and an outer diameter D2 of light source are each less than a diameter of the toilet mounting hole 19 through which closet bolt 20 will extend when the toilet is installed. As used herein, "outer diameter" can have its ordinary meaning with respect to a cylindrical sleeve 32 and a cylindrical light source 34, and it can also have a broader meaning that refers to a maximum transverse dimension of sleeve 32 and a maximum transverse dimension of light source 34 if the sleeve or light source has a non-circular cross-sectional shape, for example a square or hexagonal shape. Consequently, use of the term "outer diameter" with respect to sleeve 32 and/or light source 34 does not imply that the sleeve and/or light source has a cylindrical outer shape.

By providing outer diameters D1, D2 less than the diameter of the corresponding toilet mounting hole 19, the sleeve 32 and the light source 34 are sized to pass through the toilet mounting hole 19 and are removable from the closet bolt 20 after a toilet 10 has been lowered onto the bathroom floor 14. A suitable outer diameter D1 of sleeve 32 is 5/16 inches (8 mm) or 3/8 inches (9.5 mm). The same sizes are also suitable for outer diameter D2 of light source 34.

Figure 5:
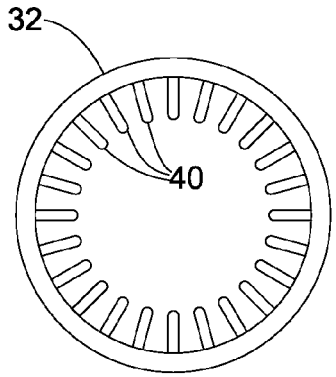
FIG. 5 is an end view of a toilet installation tool sleeve formed in accordance with an alternative embodiment of the invention, wherein the sleeve has internal fingers for gripping a closet bolt.

Sleeve 32 may be formed of metal, rubber, or plastic tubing. The tubing may be provided with internal threads 38 designed to mate with the threads of closet bolt 20. Common closet bolt thread sizes include 5/16"-18 and 1/4"-20. The interior of sleeve may also be unthreaded, with an inner diameter sized just slightly larger than the diameter of the closet bolt such that the sleeve 32 is slidable onto and off of closet bolt 20 and will align vertically with the closet bolt when mounted thereon. In one embodiment, shown in FIG. 5, sleeve 32 may be a molded plastic or rubber tube having a plurality of internal deformable fingers 40 for frictionally engaging closet bolt 20.

Light source 34 may be an LED "tap" light, a twist-activated LED "balloon light" commonly used to illuminate balloons, a switch activated LED unit, or other light source including a standard filament light source. Light source 34 may be permanently attached to sleeve 32, but it is advantageous to removably attach light source 34 to sleeve 32, and to choose a light source 34 having an internal power source 42, because this will allow the light source to be used with sleeves of various lengths as described further below. To removably attach light source 34 to sleeve 32, the light source may be provided with a threaded stem 44 for mating with an internally-threaded sleeve 32. Alternatively, light source 34 may be provided with a stem that plugs into the top end of sleeve 32 and is held by friction, or a spring-loaded button latch system may be provided between light source 34 and sleeve 32 for removable attachment of the light source to the sleeve.

Light source 34 preferably uses a blue LED as a light-emitting element 35, however other colors and bulb types are possible. The light-emitting element may be covered by a spherical light-diffusing cover 37 so that the light flux is essentially over 360 degrees and does not form a directed beam that would temporarily blind an installer looking down on it, as would be the case with a common flashlight.

Figure 6:
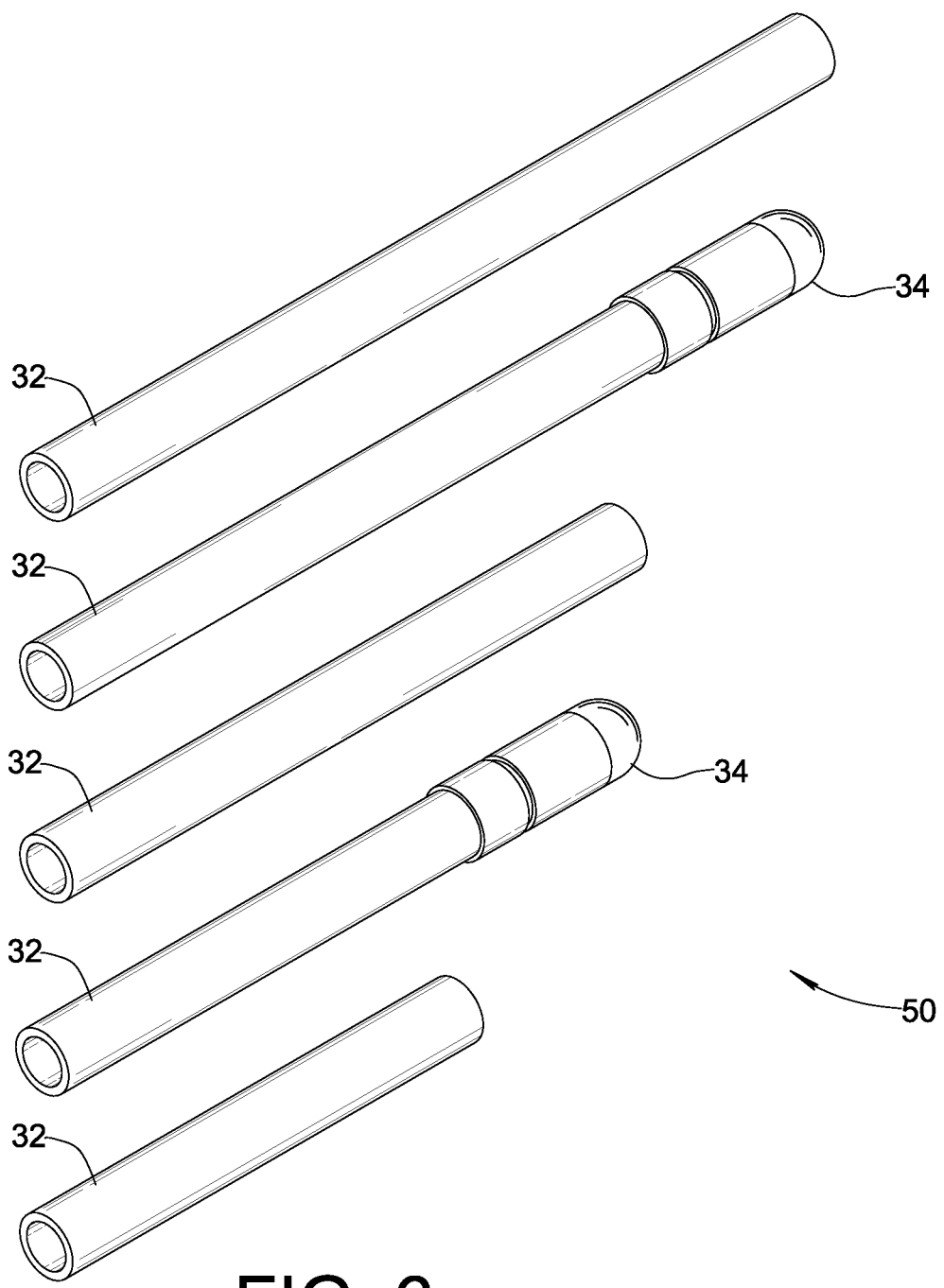
FIG. 6 is a perspective view of a toilet installation kit formed in accordance with the present invention.

As illustrated in FIG. 6, the invention may be embodied in a kit 50 having two light sources 34 and two or more sleeves 32, whereby a pair of tools 30 may be assembled, one for each of the pair of closet bolts 20. In an advantageous embodiment, the sleeves have various lengths to further facilitate installation as will be described below. The sleeves 32 may range from one inch to six inches in length. A base of each light source 34 may be configured as a shortest sleeve 32 to be removably attachable to both a sleeve 32 and directly to a closet bolt 20.

Figure 7A:
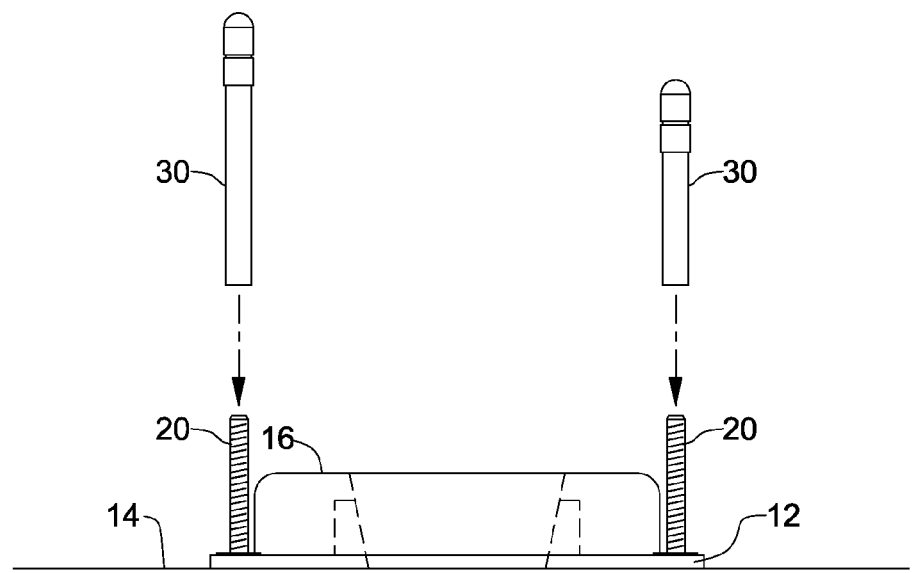
FIGS. 7A and 7B are elevational views similar to that of FIG. 2 illustrating a method of mounting a toilet on a pair of closet bolts during installation of the toilet using the toilet installation tool and kit of the present invention.
Figure 7B:
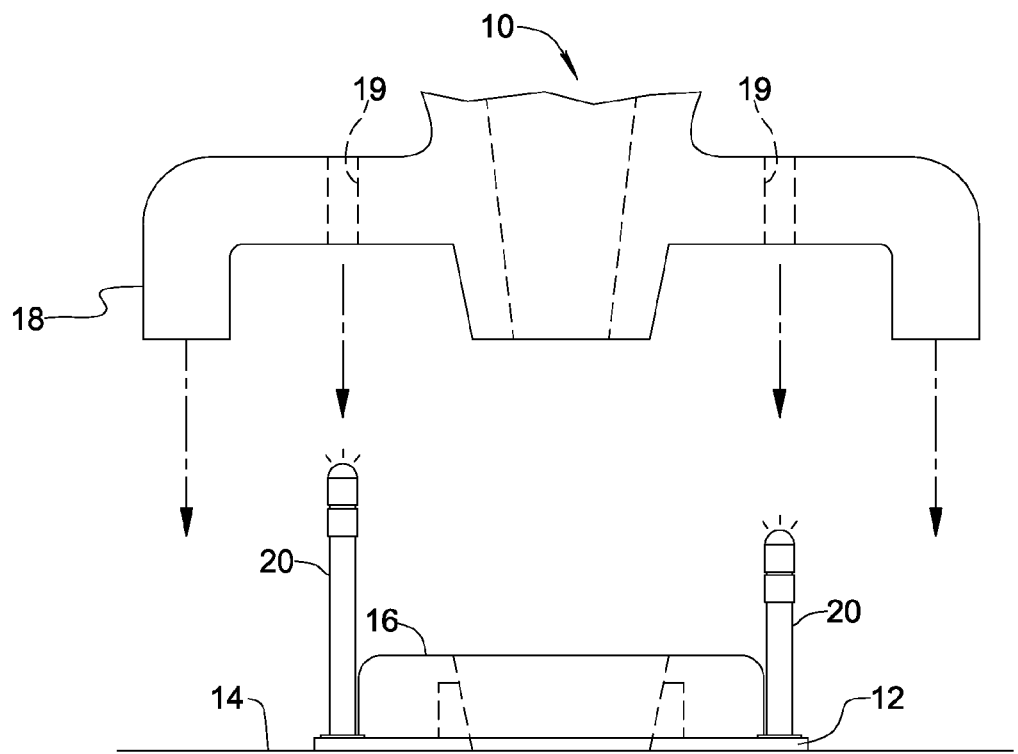

FIGS. 7A and 7B illustrate a method of using tool 30 and kit 50 to assist an installer in aligning a pair of toilet mounting holes 19 in a base of a toilet 10 with a pair of upstanding closet bolts 20. First, as shown in FIG. 7A, a tool 30 is removably mounted on each of the pair of closet bolts 20 such that the light source 34 is aligned on a vertical axis of the corresponding closet bolt. As may be seen, sleeves 32 are of different lengths such that one light source 34 is higher than the other light source. The light sources 34 are turned on, and then the toilet 10 may be lifted above light sources 34. As may be understood, the light from light sources 34 helps the installer find the aligned position of toilet 10, which is heavy and blocks overhead light. Toilet 10 is then lowered onto floor 14 as shown in FIG. 7B such that each light source 34 passes through a respective one of the pair of toilet mounting holes 19. By providing two tools 30 having sleeves 32 of different lengths, one light source 34 is positioned higher than the other light source so that when toilet 10 is lowered, the higher light source passes through a mounting hole 19 before the lower light source does, thereby allowing the freedom for slight adjustment to align to the lower light source after the higher light source has already passed through its associated mounting hole. If the light sources are at the same height, the toilet must be lowered evenly and in perfect alignment to allow both light sources 34 to pass through corresponding mounting holes 19 simultaneously, which can be challenging for inexperienced installers. Once toilet 10 is resting on floor 14 in proper position, the tools 30 are removed in an upward direction from closet bolts 20 so that installation can be completed in the known manner.

As will be understood, the present invention allows more efficient toilet installation and helps prevent the common frustrations of trying to align the toilet mounting holes with the closet bolts without damaging the wax ring or displacing the closet bolts. As a result, the invention reduces back injuries incurred from lifting and positioning the toilet.

While the invention has been described in connection with exemplary embodiments, the detailed description is not intended to limit the scope of the invention to the particular forms set forth. The invention is intended to cover such alternatives, modifications and equivalents of the described embodiment as may be included within the spirit and scope of the invention.

What is claimed is:

1. A toilet installation tool for assisting an installer in aligning a toilet mounting hole in a base of a toilet with a closet bolt projecting upward from a bathroom floor, the installation tool comprising:

a sleeve having an open bottom end, the sleeve being configured to removably mount on the closet bolt in alignment with a vertical axis of the closet bolt; and a light source attached to a top end of the sleeve;

wherein the sleeve and the light source are sized to pass through the toilet mounting hole and are removable from the closet bolt after the toilet has been lowered onto the bathroom floor.

2. The toilet installation tool according to claim 1, wherein the sleeve is internally threaded for mating with the closet bolt.

3. The toilet installation tool according to claim 1, wherein the first sleeve is slidably mountable on the closet bolt.

4. The toilet installation kit according to claim 3, wherein the sleeve has internal deformable fingers for frictionally engaging the closet bolt.

5. The toilet installation kit according to claim 1, wherein the light source includes a light-emitting diode covered by a spherical light-diffusing cover.

6. A toilet installation kit for assisting an installer in aligning a pair of toilet mounting holes in a base of a toilet with a corresponding pair of closet bolts each projecting upward from a bathroom floor, the installation kit comprising:
   a first sleeve having an open bottom end, the first sleeve being configured to removably mount on a first of the pair of closet bolts in alignment with a vertical axis of the first closet bolt;
   a first light source attached to a top end of the first sleeve;
   a second sleeve having an open bottom end, the second sleeve being configured to removably mount on a second of the pair of closet bolts in alignment with a vertical axis of the second closet bolt; and
   a second light source attached to a top end of the second sleeve;
   wherein the first sleeve and the first light source are sized to pass through a first of the pair of toilet mounting holes and are removable from the first closet bolt after the toilet has been lowered onto the bathroom floor, and the second sleeve and the second light source are sized to pass through a second of the pair of toilet mounting holes and are removable from the second closet bolt after the the toilet has been lowered onto the bathroom floor.

7. The toilet installation kit according to claim 6, wherein the first sleeve is longer than the second sleeve.

8. The toilet installation kit according to claim 6, wherein the first sleeve and the second sleeve are internally threaded for mating with the first closet bolt and the second closet bolt, respectively.

9. The toilet installation kit according to claim 6, wherein the first sleeve and the second sleeve are slidably mountable on the first closet bolt and the second closet bolt, respectively.

10. The toilet installation kit according to claim 9, wherein the first sleeve and the second sleeve each have internal deformable fingers for frictionally engaging the first closet bolt and the second closet bolt, respectively.

11. The toilet installation kit according to claim 6, wherein the first light source and the second light source each include a light-emitting diode covered by a spherical light-diffusing cover.

12. A method of mounting a toilet on a pair of closet bolts each projecting upward from a bathroom floor during installation of the toilet, the method comprising the steps of:
   removably mounting a first light source on a first of the pair of closet bolts, wherein the first light source is aligned on a vertical axis of the first closet bolt;
   removably mounting a second light source on a second of the pair of closet bolts, wherein the second light source is aligned on a vertical axis of the second closet bolt;
   turning on the first and second light sources;
   lifting the toilet above the first and second light sources and respectively aligning a pair of toilet mounting holes in a base of the toilet with the first and second light sources;
   lowering the toilet onto the floor such that the first light source passes through one of the pair of toilet mounting holes and the second light source passes through another of the pair of toilet mounting holes; and
   removing the first and second light sources from the first and second closet bolts.

13. The method according to claim 10, wherein the first and second light sources are mounted on the first and second closet bolts at different heights.

\* \* \* \* \*